June 16, 1964    J. A. FULKER    3,137,281
BOAT ENGINE COOLING SYSTEM
Filed July 30, 1963    2 Sheets-Sheet 1

INVENTOR
Joseph A. Fulker
BY Donald D. Denton
ATTORNEY

June 16, 1964    J. A. FULKER    3,137,281
BOAT ENGINE COOLING SYSTEM
Filed July 30, 1963    2 Sheets-Sheet 2

INVENTOR
Joseph A. Fulker

BY
Donald D. Denton
ATTORNEY

3,137,281
BOAT ENGINE COOLING SYSTEM
Joseph A. Fulker, 4925 Belair Road, Baltimore 6, Md.
Filed July 30, 1963, Ser. No. 298,658
9 Claims. (Cl. 123—41.02)

This invention relates to cooling systems for marine engines, and more particularly to a cooling system for marine engines that automatically provides for cooling of the engine following engine cut-off to avoid damage to engine parts from contact of coolant water with the hot engine structure when the engine is restarted.

Many fishing craft, sport-type boats and other marine vessels employ propulsion units of the internal combustion engine type utilizing water cooling of the engine. Water is pumped from the medium in which the boat is floating directly into the engine cooling jacket to contact the hot engine structure so as to cool it. In the usual type installation, the cooling water pump operates only while the engine is running. When the engine is switched off, all effective circulation of the cooling water stops and areas or pockets of heat tend to remain and to build up within portions of the engine as a result of the high residual heat remaining in the metal of the engine parts. If the engine is restarted before the residual heat has a chance to dissipate, the inrush of relatively cold water pumped in through the hull of the boat can crack the engine block or heads, thus causing major damage to the engine. This is particularly true in the spring and fall when the ambient temperature of bodies of water has dropped.

This invention contemplates a marine engine cooling system in which a secondary cooling water circulation means pumps water from the surrounding body through the hull of the boat to remove heat accumulation in the engine after the engine has been shut down. Advantageously, the secondary water circulation means may be automatically controlled so that, at the time the engine is cut off, the secondary cooling means is actuated to pump the cooling water through the engine to prevent build-up of heat in it.

It has been found that heat is extracted from the engine and the cooling system in this manner to assure a partial but sufficient cooling of the engine parts in a continued even manner. This lessens heat build-up and formation of overheated pockets in localized area within the engine following cut-off of the secondary cooling pump. Consequently, on restarting the engine, the temperature differential between the engine parts and the cooling water entering the system will be reduced within safe limits and the engine parts will not be overstressed or damaged by the inflow of relatively colder water into the cooling system. Provision of means in the system for a limited elapsed time period of operation of the secondary cooling pump insures sufficient cooling of the engine to give protection from the possibility of engine damage on quick restarts.

A conventional timer device may be employed in my system for providing control of the elapsed time period to effect the desired period of operation of the secondary pump after engine cut-off. It will be appreciated that the mechanism of the timer device can be settable by the boat operator for any suitable selected time period of operation.

Advantageously, a thermal means for controlling operation of the secondary pump may be employed so that the pump is brought into operation automatically on engine cut-off to pump cooling water through the engine for a desired period following which the pump is cut off in automatic response to operation of the said thermal device. The thermal device may include a heat sensitive means, such as a thermostat or thermocouple, responsive to the heat of the engine or of the cooling water temperature. The thermostat may operate in conjunction with any necessary electrical relays and contacts to effect the desired pump operation. Desirably, the thermal device will be selectively settable by the boat operator for cut-off of the second pump at a desired engine temperature or cooling water exit temperature.

These and other objects will be apparent from the accompanying drawings, in which.

Figure 1:
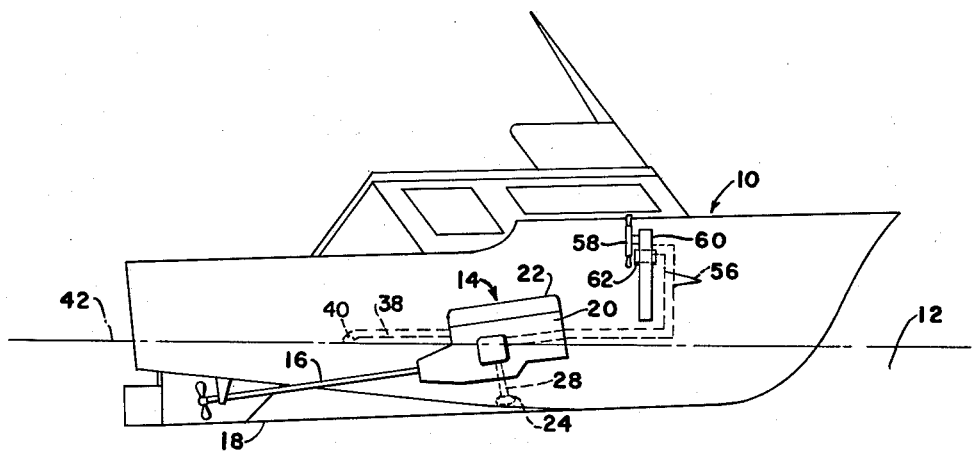
FIGURE 1 is a view in elevation of a marine vessel showing in outline its engine intake for cooling water and control board.
Figure 2:
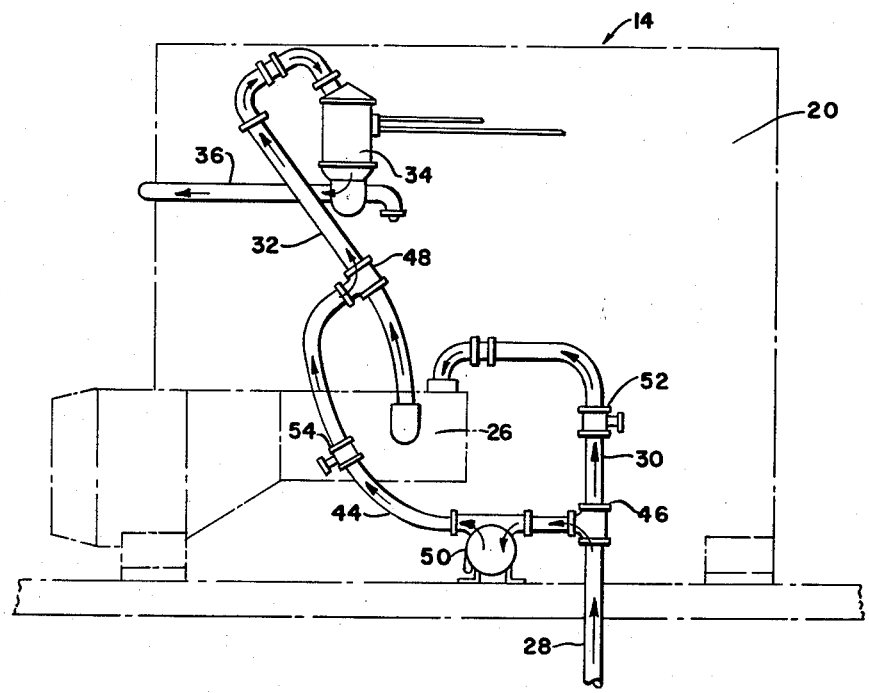
FIGURE 2 is a schematic view in elevation of the cooling system of this invention.

Referring to the drawings, FIGURES 1 and 2 show a boat 10 floating in water 12. The boat has an internal combustion engine 14 for driving it by means of shaft 16 and propeller 18. The engine has conventional water jacketed cooling in the engine block 20 and engine block head 22.

A water inlet 24 is positioned in the hull of the boat so that cooling water for circulation direct to the engine can be taken from the water surrounding the boat. Coupled to the engine is a main cooling water circulating pump 26 driven by the engine through gears (not shown) so that while the engine is running the pump circulates water which cools the engine. Water is circulated to the engine by being drawn by the pump through water inlet lines 28 and 30 into the pump 26 which then discharges the water through line 32, oil cooler 34, and line 36 to the cooling jacket within the engine block and head (see FIGURE 2). Lines 28, 30, 32 and 36 provide a path for cooling water to be supplied to the engine. Water circulated within the engine block and engine head is discharged through line 38.

An auxiliary bypass line 44 for cooling water is provided to connect into lines 28, 30 and 32 by T connections 46 and 48 so as to bypass the main cooling pump. A secondary cooling water pump 50 is operatively connected in the bypass line so that it can be operated to pump cooling water to the engine when the main pump is not operative. Check valves 52 and 54 are provided for preventing a reverse flow of water within their respective lines 30 and 44 when the pumps are inoperative.

It will be appreciated that the secondary pump may have any separate source of power or be connected to the boat engine battery for energization of its prime mover or motor. The motor of the pump 50 may also be connected by electrical circuit means illustrated schematically at 56 with the boat engine starting switch 58 located on instrument panel 60 at the boat operator's station. Operatively associated with the circuit is a timer device 62 also located at the boat operator's station but which may be alternatively located at any convenient place in the boat, as for example, at the engine at the second pump. The timer device may include an electric clock mechanism, but I prefer to use a mechanical timer mechanism, as for example, spring actuated but electric solenoid energized and controlled, and which is provided with all necessary relays, contacts, and other parts for its proper operation. The timer device may have a dial and knob (not shown) for selecting and for setting its desired period of operation as well as for displaying the elapsed portion of the selected time period when it is in operation. Such timer devices are conventional and it is not believed necessary to describe their construction here in greater detail.

Figure 3:
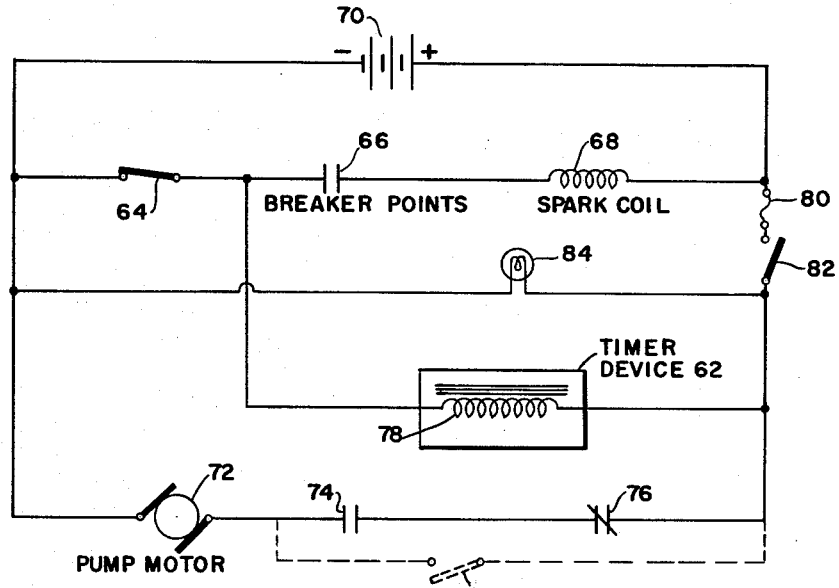
FIGURE 3 is an electric circuit diagram which may be employed showing the use of a timer device to control the operation of the secondary cooling water pump.

Exemplary of an electric circuit means useful for operating the cooling system of my invention is the circuit shown in FIGURE 3. Boat engine starting switch 64 is energized in series connection with the usual breaker points 66 and spark coil 68 across engine battery 70. Connected between positive and negative sides of the circuit is the pump motor 72 which operates the second cooling water pump 50. In series with the pump motor are normally open contacts 74 and normally closed contacts 76. Connected for actuating of the timing mechanism (not shown) of timer device 62 is relay solenoid 78 in series with the boat engine starting switch. The circuit also includes a safety fuse 80, manual cut-out switch 82, and a pilot light 48 for indicating that there is power on the system. Advantageously, the circuit means may include a switch connecting the positive terminal of the battery directly to the pump motor in a known manner so that the pump may be operated at any time, as for example, if the main cooling water pump should fail to function.

When a timer device is used, operation of my system is as follows: When the boat is to be run for a time sufficient to heat the engine followed by stopping the engine, as for example, at a fishing or swimming spot, initial starting of the engine by switch 64 energizes the solenoid 78 which energizes the timing mechanism of timer 62 but holds it out of operation. The solenoid also acts to open normally closed contacts 76 and close normally open contacts 74. The normally closed contacts remain open so long as the engine is running, thereby preventing the second pump from operating while the engine and main cooling water pump are running. Cut-off of the engine, of course, also stops the main cooling water pump. When this is effected on opening of switch 64, solenoid 78 is deenergized which both both permits the timing mechanism of timer device 62 to function and closes contacts 76 so that the circuit to the motor of the second pump is automatically completed across the line to the battery.

Pump 50 now operates to pump water from the medium surrounding the boat through water inlet 24 and line 28 into the bypass line 44 around main cooling water pump 26. Cooling water is then passed by pump 50 into lines 32 and 36 to be passed for cooling through the engine block and head and to be discharged overboard through line 38 and outlet 40. The second pump continues to pump cooling water through the system until the timing mechanism of timer device 62 completes its cycle or period of operation. This period may be of any duration which will sufficiently cool but not overcool the engine to prevent thermal shock and damage from colder entering cooling water when the engine is restarted. The actual desirable time set will depend on the capacity of the second cooling pump, the temperature of the surrounding water and the temperature and mass of the engine. I have found that fifteen to twenty minutes is a suitable initial time period for continued cooling of the engine by operation of the secondary pump.

At completion of the set time period, the timing mechanism of the timer device acts to automatically open normally open contacts 74 deenergizing motor 72 of pump 50 and stopping its operation. The entire system has now been automatically returned to an "at rest" condition with the boat engine sufficiently cooled to prevent stresses of thermal shock and damage by entrance to the cooling system of water from the medium in which the boat is floating. The system is now ready for another complete cycle of operation as described. It will be understood that should the boat engine be restarted before completion of the pre-set timer period, closing of the motor starting switch will stop operation of the second pump as above described so that no interference with the main cooling pump occurs.

Figure 4:
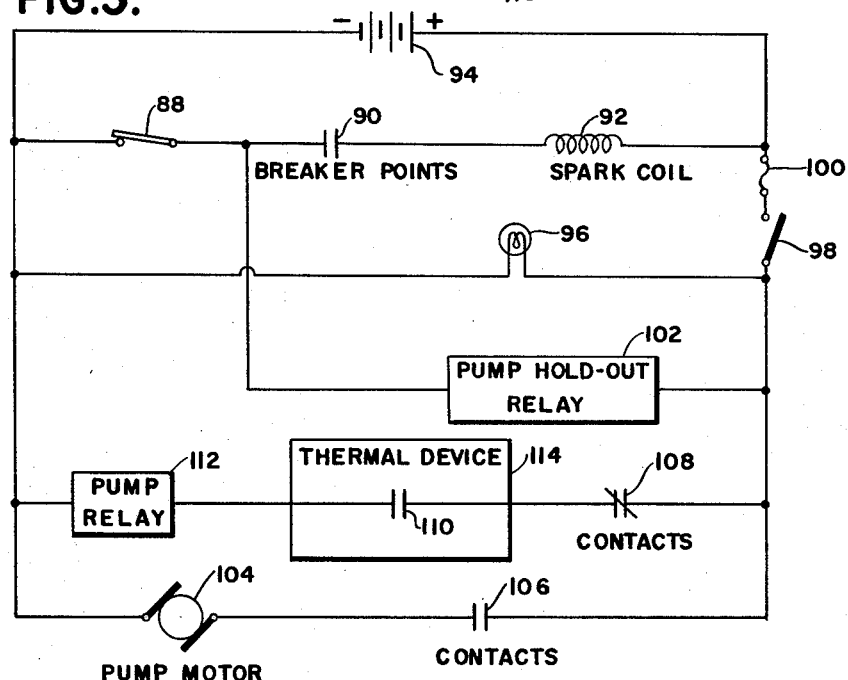
FIGURE 4 is an electric circuit diagram which may be employed showing the use of a thermal device to control the operation of the secondary cooling water pump.

In FIGURE 4, I have shown an alternate circuit which may be employed in which a temperature actuated control, such as a thermostat operated thermal relay, is used. This system may be used instead of the timer controlled circuit described above. As shown in this circuit, engine starting switch 88 is connected in series with breaker points 90 and spark coil 92, across the terminals of engine battery 94. Pilot light 96 which is across the line in series with the system manual cut-out switch 98 and safety fuse 100 will indicate when the system has power. Pump hold-out relay solenoid 102 is placed in series between the engine starting switch and the positive side of the circuit so that the solenoid is energized when the engine is switched on. Pump motor 104 for operating the second pump, and which is in series connection with normally open contacts 106, is also connected across the line.

Connected in series across the line but in parallel connection with the pump motor and contacts 106, are normally closed pump hold-out contacts 108, normally open contacts 110 and pump relay solenoid 112. Solenoid 102 is arranged to actuate contacts 108 and solenoid 112 actuates contacts 106.

A heat sensing thermostat (not shown) is operatively connected as a part of the thermal device 114 which includes the contacts 110. The thermostat is positioned to sense the engine cooling water exit temperature and effects control of the operation of the second pump by causing actuation of contacts 110. Preferably, the thermostat is of the bellows type but may be a bi-metallic element or alternatively a thermocouple may be arranged in a known manner to cause contacts 110 to be actuated. Such thermostats and their manner of effecting actuation of electrical circuit contacts are well known and it is not believed necessary to further describe them here. The thermostat is settable to effect actuation of the contacts 110 at any desired exit water or engine temperature. I prefer, however, to set the thermostatic device for actuation several degrees below normal engine water running temperature, for example at 140° to 160° F. The thermostat may operate on a sufficient temperature differential so that residual heat within the engine does not too quickly heat the thermostat to the point of again causing the second pump to be cut-on.

In operation of the system using the thermal device, when the boat engine is started by closing starting switch 88, pump hold-out relay solenoid 102 will be energized. The solenoid acts to open normally closed pump holdout contacts 108, thereby preventing operation of the second pump should the thermostat close thermal device contacts 110 while the engine is running. When switch 88 is opened to cut off the engine, solenoid 102 is deenergized permitting the contacts 108 to close. Thermal device contacts 110 will have been caused to close by the thermostat of device 114 due to engine heat. The circuit to the pump relay solenoid 112 is then complete. Solenoid 112 being thus energized, acts to close contacts 106 to place the motor 104 and consequently the second pump into operation. It will be observed that the second pump has automatically been brought into operation at cut-off of the engine and the main cooling water pump so that a flow of coolant continues to pass through the engine after it is stopped. The pump continues to run and remove units of residual heat until a drop in engine temperature or cooling water exit temperature actuates the thermostat of thermal device 114 causing it to open the contacts 110. This effects automatic cut-off of pump 104 after the desired period of continued engine cooling by opening the circuit to solenoid 112 deenergizing it to open contacts 106 which in turn open the circuit to the pump motor.

It will be appreciated that the engine cooling system of this invention also provides for the dissipating of heat from the engine if the engine cooling pump should break down during operation. In FIGURE 3 is shown a switch 116 which when switch 82 is closed, may be closed to provide auxiliary pump means for cooling the engine by operation of secondary pump 62.

It is obvious that various changes and modifications may be made in the details of construction and design of the above specifically described embodiments of this invention without departing from the spirit thereof, such changes and modifications being restricted only by the scope of the following claims.

What is claimed is:

1. A boat engine cooling system for removing heat after engine cut-off to prevent damage to the engine by thermal shock upon restarting which comprises a internal combustion engine having passageways for passing cooling water through it during operation, a first pump operable with the running of said engine for pumping water from outside said boat through said passageways, a secondary pump operably connected in the cooling system for pumping water from outside said boat through said passageways immediately after said engine is stopped so as to dissipate heat from the engine and means for energizing and deenergizing said secondary pump.

2. The boat engine cooling system of claim 1 in which the means for energizing and deenergizing said secondary pump is time controlled.

3. The boat engine cooling system of claim 1 in which the means for energizing and deenergizing said secondary pump is thermally controlled.

4. The boat engine cooling system of claim 1 in which said secondary pump is operable on failure of said first pump to prevent said engine from overheating while running.

5. A boat engine cooling system comprising an engine having a cooling water jacket, means defining a passageway for cooling water to enter into and exit from said cooling water jacket, a first pump operable with the running of the engine to pump water from outside said boat through said passageway, a secondary pump positioned in a bypass line to said first pump for pumping water from outside said boat through said passageway, means for controlling the energizing of said secondary pump on stopping of the engine, and a timer for automatically regulating the period of time of operation of said secondary pump.

6. The boat engine cooling system of claim 5 in which the timer has means for selectively setting and controlling the duration of operation of the secondary pump.

7. A boat engine cooling system comprising an engine having passageways for conducting cooling water from outside said boat through said engine, a pump operable during the running of the engine for circulating the cooling water through said passageways, a secondary pump operable and energized when said engine is cut off for circulating the cooling water through said passageways, thermal means for controlling the energizing of said secondary pump when said engine is cut off and for deenergizing said secondary pump when heat detrimental to restarting has been dissipated from the engine.

8. The boat engine cooling system of claim 7 in which said thermal means has means for selectively setting and controlling the duration of the operation of said pump.

9. A boat engine cooling system comprising an internal combustion engine having a cooling jacket, a first passageway from outside said boat beneath the water line thereof to said cooling jacket and a second passageway from said cooling jacket to outside said boat, a first pump in said first passageway operable with the running of the engine, a third passageway in bypass arrangement to said first pump for permitting water to be passed from outside the boat to said cooling jacket when the said first pump is inoperative, a second pump in said third passageway, and means operable to effect energization of said second pump on stopping of said engine whereby said second pump operates to pump water through the said passageways bypassing said first pump to dissipate heat detrimental to restarting the engine.

References Cited in the file of this patent

UNITED STATES PATENTS

| | | |
|---|---|---|
| 1,167,509 | MacDonald | Jan. 11, 1916 |
| 1,829,195 | Simmen | Oct. 27, 1931 |
| 2,070,615 | Plante | Feb. 16, 1937 |